(12) United States Patent
Tahara et al.

(10) Patent No.: US 11,793,382 B2
(45) Date of Patent: Oct. 24, 2023

(54) DUST COLLECTOR

(71) Applicant: MAKITA CORPORATION, Anjo (JP)

(72) Inventors: Takayuki Tahara, Anjo (JP); Hiroto Nishiguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 4 days.

(21) Appl. No.: 17/553,056

(22) Filed: Dec. 16, 2021

(65) Prior Publication Data
US 2022/0233042 A1    Jul. 28, 2022

(30) Foreign Application Priority Data
Jan. 22, 2021    (JP) ................................. 2021-008966

(51) Int. Cl.
   A47L 9/22    (2006.01)
   H02K 9/06    (2006.01)
   A47L 5/36    (2006.01)

(52) U.S. Cl.
   CPC ...... *A47L 9/22* (2013.01); *A47L 5/36* (2013.01); *H02K 9/06* (2013.01)

(58) Field of Classification Search
   CPC .................................... A47L 5/36; H02K 9/06
   USPC .......................................................... 15/413
   See application file for complete search history.

(56) References Cited

U.S. PATENT DOCUMENTS

| | | | | |
|---|---|---|---|---|
| 1,484,962 A | * | 2/1924 | Randle | H02K 9/06 310/60 R |
| 2,091,537 A | * | 8/1937 | Wahlborg | A47L 5/362 346/40 |
| 2,884,185 A | * | 4/1959 | Dolan | A47L 5/12 415/24 |
| 3,780,397 A | * | 12/1973 | Harbeck | A47L 7/0042 310/58 |
| 3,874,023 A | * | 4/1975 | Tschudy | A47L 5/22 181/207 |
| 3,875,436 A | * | 4/1975 | MacFarland | A47L 9/2889 310/43 |
| 4,120,616 A | * | 10/1978 | Dwyer | F04D 29/4213 417/373 |
| 4,330,899 A | * | 5/1982 | Miller | A47L 9/00 15/326 |
| 4,640,697 A | * | 2/1987 | Erickson, Jr. | A47L 9/182 96/333 |
| 5,448,794 A | * | 9/1995 | Walch | A47L 9/22 15/326 |
| 6,003,200 A | * | 12/1999 | Potts | A47L 7/0028 15/327.2 |
| 6,004,093 A | * | 12/1999 | Ishikawa | F04D 29/083 415/57.2 |

(Continued)

FOREIGN PATENT DOCUMENTS

JP     S52-006573 A     1/1977

*Primary Examiner* — Brian D Keller
*Assistant Examiner* — Tim Brady
(74) *Attorney, Agent, or Firm* — Oliff PLC (57) ABSTRACT

A motor in a dust collector is cooled. The dust collector includes a body housing, a motor located inside the body housing, a cooling fan rotatable by the motor to feed a gas to around the motor and to discharge the gas from around the motor, and a support including a channel through which the gas is flown by the cooling fan. The support supports the motor.

20 Claims, 8 Drawing Sheets

(56) References Cited

U.S. PATENT DOCUMENTS

| | | | | |
|---|---|---|---|---|
| 6,175,988 | B1* | 1/2001 | White | A47L 7/0028 |
| | | | | 15/327.6 |
| 8,533,906 | B2* | 9/2013 | Liu | A47L 9/1666 |
| | | | | 15/327.2 |
| 11,278,837 | B2* | 3/2022 | Tahara | A47L 5/36 |
| 2006/0156504 | A1* | 7/2006 | Bruneau | A47L 5/22 |
| | | | | 15/301 |
| 2012/0269663 | A1* | 10/2012 | Kamiya | F04D 25/0673 |
| | | | | 417/411 |
| 2015/0377253 | A1* | 12/2015 | Shibata | F04D 25/082 |
| | | | | 415/119 |
| 2016/0345714 | A1* | 12/2016 | Yamaoka | B25F 5/02 |
| 2017/0007085 | A1* | 1/2017 | Tahara | A47L 9/24 |
| 2018/0235419 | A1* | 8/2018 | Tahara | A47L 9/122 |
| 2019/0021243 | A1* | 1/2019 | Naka | A01G 20/47 |
| 2019/0313864 | A1* | 10/2019 | Tahara | A47L 9/24 |
| 2020/0281424 | A1* | 9/2020 | Tahara | A47L 9/2821 |
| 2020/0282353 | A1* | 9/2020 | Takano | B01D 46/4236 |
| 2020/0378404 | A1* | 12/2020 | Fukunaga | B08B 5/02 |
| 2021/0121031 | A1* | 4/2021 | Takano | F04D 29/668 |
| 2021/0148372 | A1* | 5/2021 | Naka | F04D 25/08 |
| 2022/0241952 | A1* | 8/2022 | Rudenstam | H02K 9/06 |

* cited by examiner

DUST COLLECTOR

CROSS-REFERENCE TO RELATED APPLICATIONS

This application claims the benefit of priority to Japanese Patent Application No. 2021-008966, filed on Jan. 22, 2021, the entire contents of which are hereby incorporated by reference.

BACKGROUND

1. Technical Field

The present disclosure relates to a dust collector.

2. Description of the Background

A known electric vacuum cleaner in the field of dust collectors includes an electric motor (motor), as described in Japanese Unexamined Patent Application Publication No. 52-006573.

BRIEF SUMMARY

Motors generate heat and are to be cooled.

One or more aspects of the present disclosure are directed to cooling a motor.

A first aspect of the present disclosure provides a dust collector, including:
- a body housing;
- a motor located inside the body housing;
- a cooling fan rotatable by the motor to feed a gas to around the motor and to discharge the gas from around the motor; and
- a support including a channel through which the gas is flown by the cooling fan, the support supporting the motor.

The structure according to the above aspect of the present disclosure allows the motor to be cooled.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as front and rear (or frontward and rearward), up and down (or vertical), and right and left (or lateral). The terms indicate relative positions or directions with respect to the center of a dust collector 1.

Dust Collector

Figure 1:
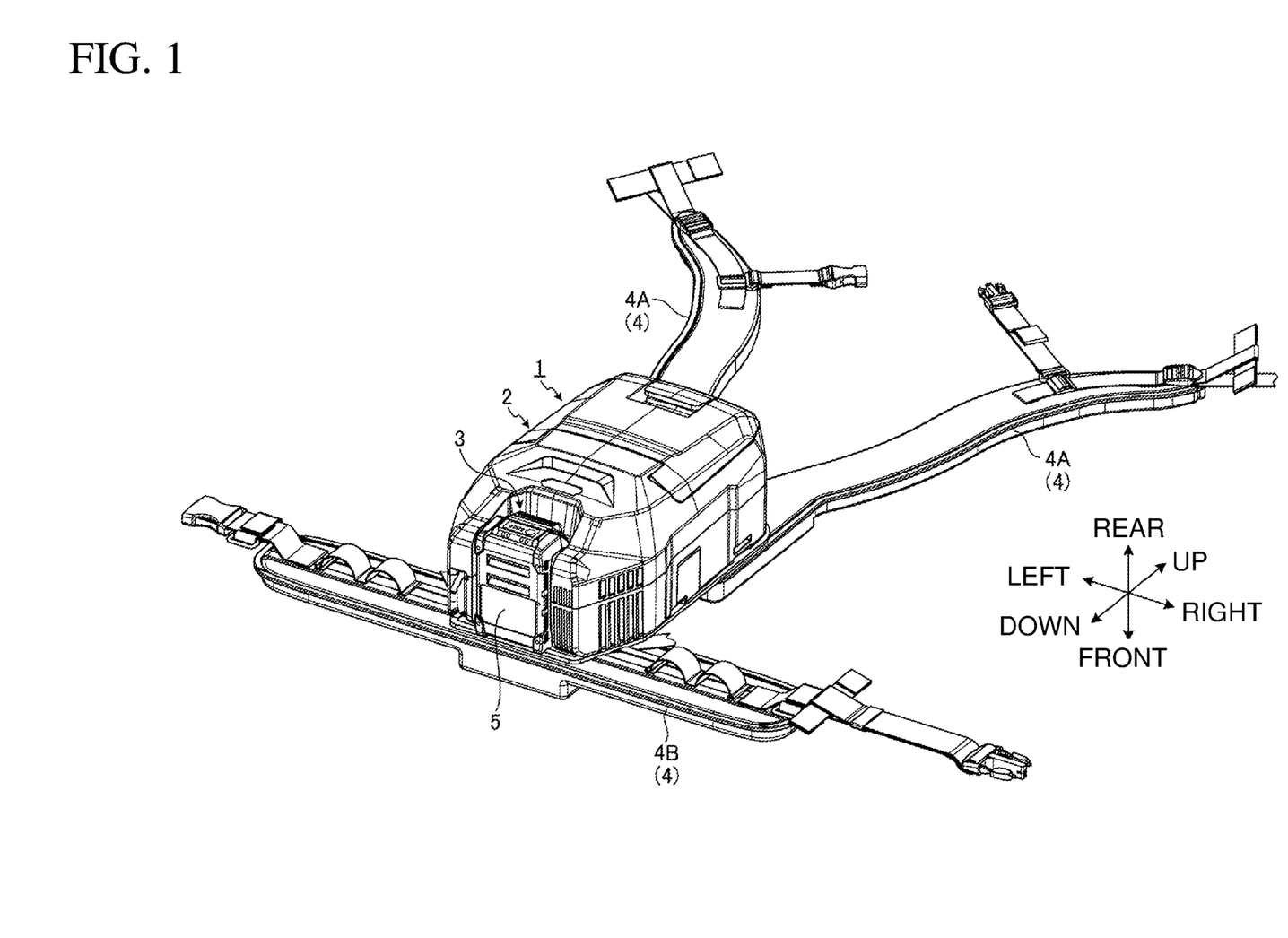
FIG. 1 is a perspective view of a dust collector according to an embodiment.

FIG. 1 is a perspective view of the dust collector 1 according to an embodiment. The dust collector 1 according to the embodiment is a back-pack dust collector wearable by a user on his or her back for use. The dust collector 1 includes a body housing 2 and a battery mount 3.

The dust collector 1 is wearable on the user's back. A harness belt 4 is connected to the dust collector 1. The harness belt 4 is connected to the body housing 2. The dust collector 1 is wearable on the user's back with the harness belt 4. The harness belt 4 includes a shoulder belt 4A and a waist belt 4B. The shoulder belt 4A is put over the user's shoulder. The waist belt 4B is put over the user's waist.

The battery mount 3 is located in a lower portion of the body housing 2. A battery pack 5 is attachable to or detachable from the battery mount 3. The battery pack 5 serves as a power supply for the dust collector 1. When mounted on the battery mount 3, the battery pack 5 powers an electronic device incorporated in the dust collector 1. The battery pack 5 is a general-purpose battery usable as a power supply for various electrical instruments. The battery pack 5 is usable for powering a power tool. The battery pack 5 is also usable for powering electrical instruments other than power tools. The battery pack 5 is usable for powering dust collectors other than the dust collector 1 according to the embodiment. The battery pack 5 includes a lithium-ion battery. The battery pack 5 includes a rechargeable battery. The battery mount 3 has the same structure as a battery mount included in a power tool.

Figure 2:
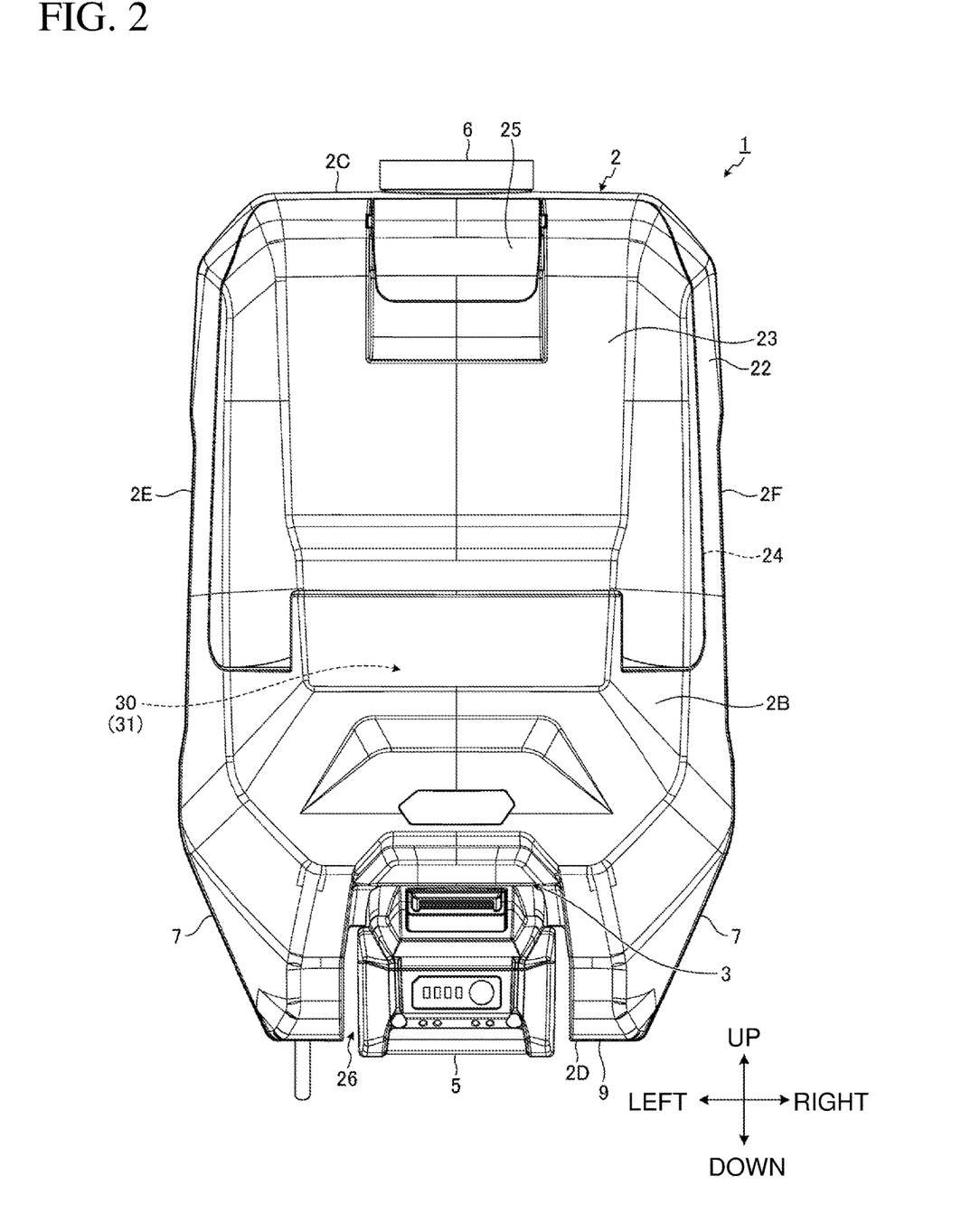
FIG. 2 is a rear view of the dust collector according to the embodiment.
Figure 3:
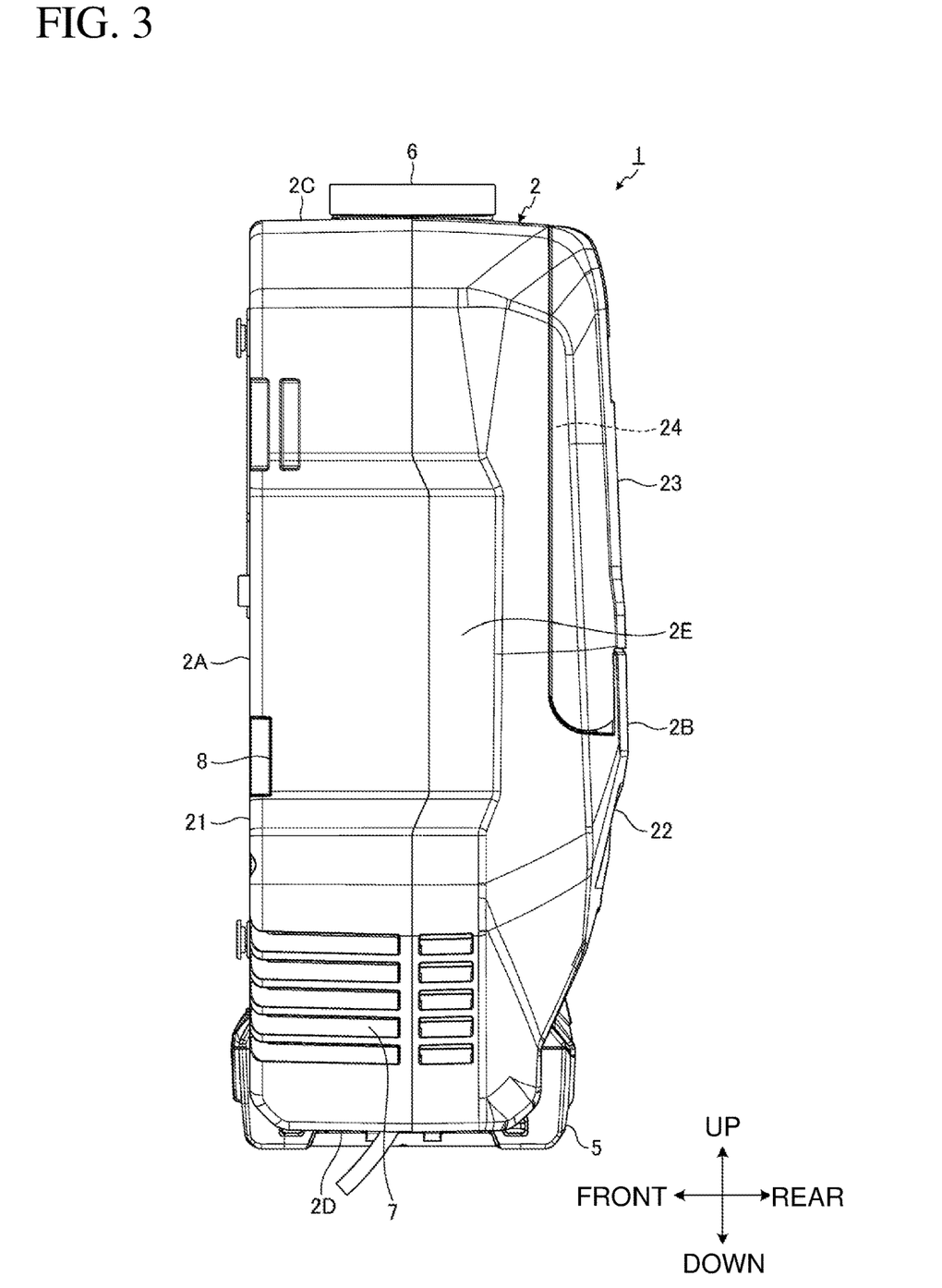
FIG. 3 is a left side view of the dust collector according to the embodiment.
Figure 4:
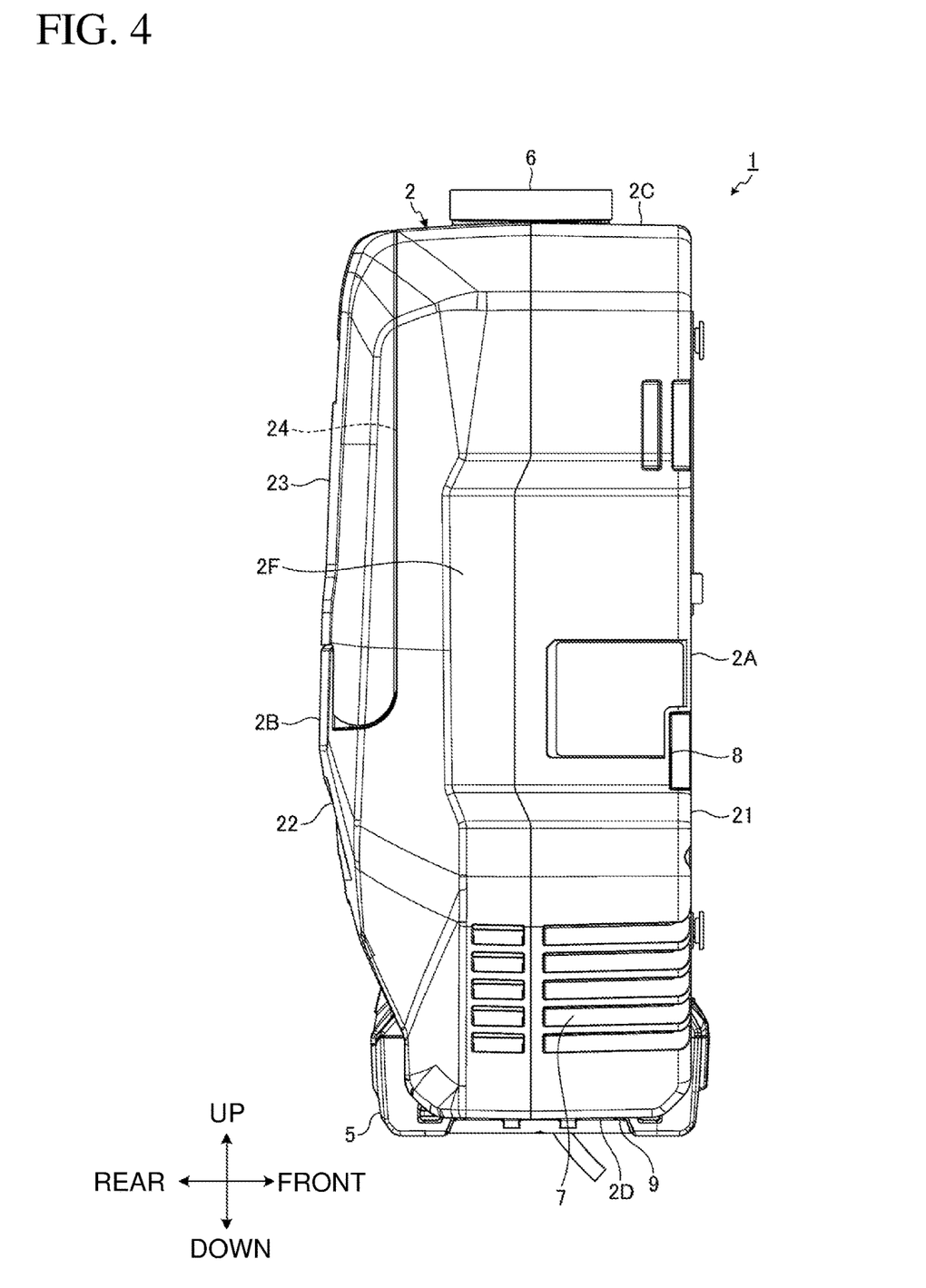
FIG. 4 is a right side view of the dust collector according to the embodiment.

FIG. 2 is a rear view of the dust collector 1 according to the embodiment. FIG. 3 is a left side view of the dust collector 1 according to the embodiment. FIG. 4 is a right side view of the dust collector 1 according to the embodiment.

The body housing 2 includes a front surface 2A, a rear surface 2B, an upper surface 2C, a lower surface 2D, a left side surface 2E, and a right side surface 2F. The front surface 2A faces frontward. The rear surface 2B faces rearward. The upper surface 2C faces upward. The lower surface 2D faces downward. The left side surface 2E faces leftward. The right side surface 2F faces rightward. When the dust collector 1 is worn on the user's back, the front surface 2A faces the user's back.

The body housing 2 has an internal space. The internal space of the body housing 2 accommodates a drive unit 30 including a motor 31. The body housing 2 in the embodiment is dividable into halves. The body housing 2 includes a front housing 21, a rear housing 22, and a dust box cover 23. The front housing 21 is located frontward from the rear housing 22. The front housing 21 includes the front surface 2A, a part of the upper surface 2C, a part of the lower surface 2D, a part of the left side surface 2E, and a part of the right side surface 2F. The rear housing 22 includes the rear surface 2B, a part of the upper surface 2C, a part of the lower surface 2D, a part of the left side surface 2E, and a part of the right side surface 2F. The rear end of the front housing 21 and the front end of the rear housing 22 are joined to each other, defining the internal space of the body housing 2. The front housing 21 and the rear housing 22 are fastened together with multiple screws.

The rear housing 22 has a body opening 24 in its upper portion. The body opening 24 communicates with the internal space of the body housing 2. The dust box cover 23 covers the body opening 24. The dust box cover 23 has its lower end coupled to the rear housing 22 in a pivotable manner. The lower end of the dust box cover 23 is hinged to the rear housing 22. The hinge has its hinge axis extending laterally. The upper end of the dust box cover 23 rotates vertically. The dust box cover 23 pivots to cover and uncover the body opening 24.

A latch 25 is located at the upper end of the rear housing 22. The latch 25 may be coupled to the upper end of the dust box cover 23. The latch 25 fastens the dust box cover 23 to the rear housing 22. The body housing 2 includes the front housing 21 and the rear housing 22 joined to each other, and the dust box cover 23 attached to the rear housing 22.

The battery mount 3 is located in a battery compartment 26. The battery compartment 26 is located in the lower portion of the body housing 2. The battery compartment 26 has a recess located in the lower portion of the body housing 2. The battery compartment 26 is recessed upward from the lower surface 2D of the body housing 2. The battery mount 3 is inside the battery compartment 26. The battery pack 5 mounted on the battery mount 3 is accommodated in the battery compartment 26.

The body housing 2 includes a suction port 6, outlets 7, body inlets 8, and a body outlet 9.

The suction port 6 sucks dust together with gas (air). The suction port 6 is located in the upper surface 2C of the body housing 2. The body housing 2 has one suction port 6. The suction port 6 connects the inside and the outside of the body housing 2. The suction port 6 is connected to a dust collection hose (not shown).

The outlets 7 discharge at least part of the gas sucked through the suction port 6. The outlets 7 are located in lower portions of the left side surface 2E and the right side surface 2F of the body housing 2. The outlets 7 connect the inside and the outside of the body housing 2.

The body inlets 8 allow gas (air) to be sucked in for cooling the motor 31. The body inlets 8 are located in the front surface 2A of the body housing 2. The body housing 2 has two body inlets 8. The two body inlets 8 align with each other in the lateral direction. The body inlets 8 connect the inside and the outside of the body housing 2.

The body outlet 9 allows at least part of the gas sucked through the body inlets 8 to be discharged. The body outlet 9 is located in the lower surface 2D of the body housing 2. The body outlet 9 connects the inside and the outside of the body housing 2.

Figure 5:
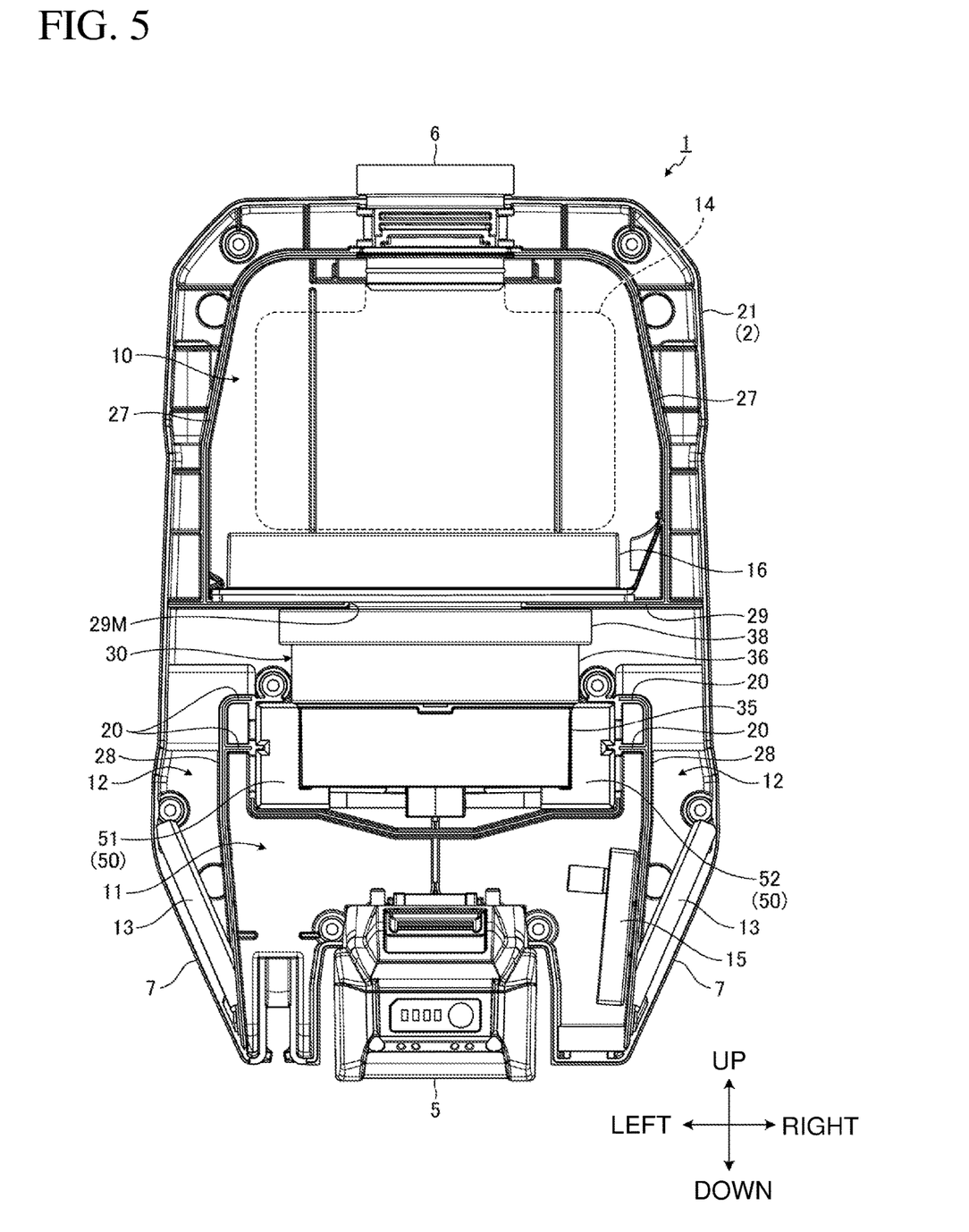
FIG. 5 is a rear view of the dust collector according to the embodiment without a rear housing and a dust box cover.
Figure 6:
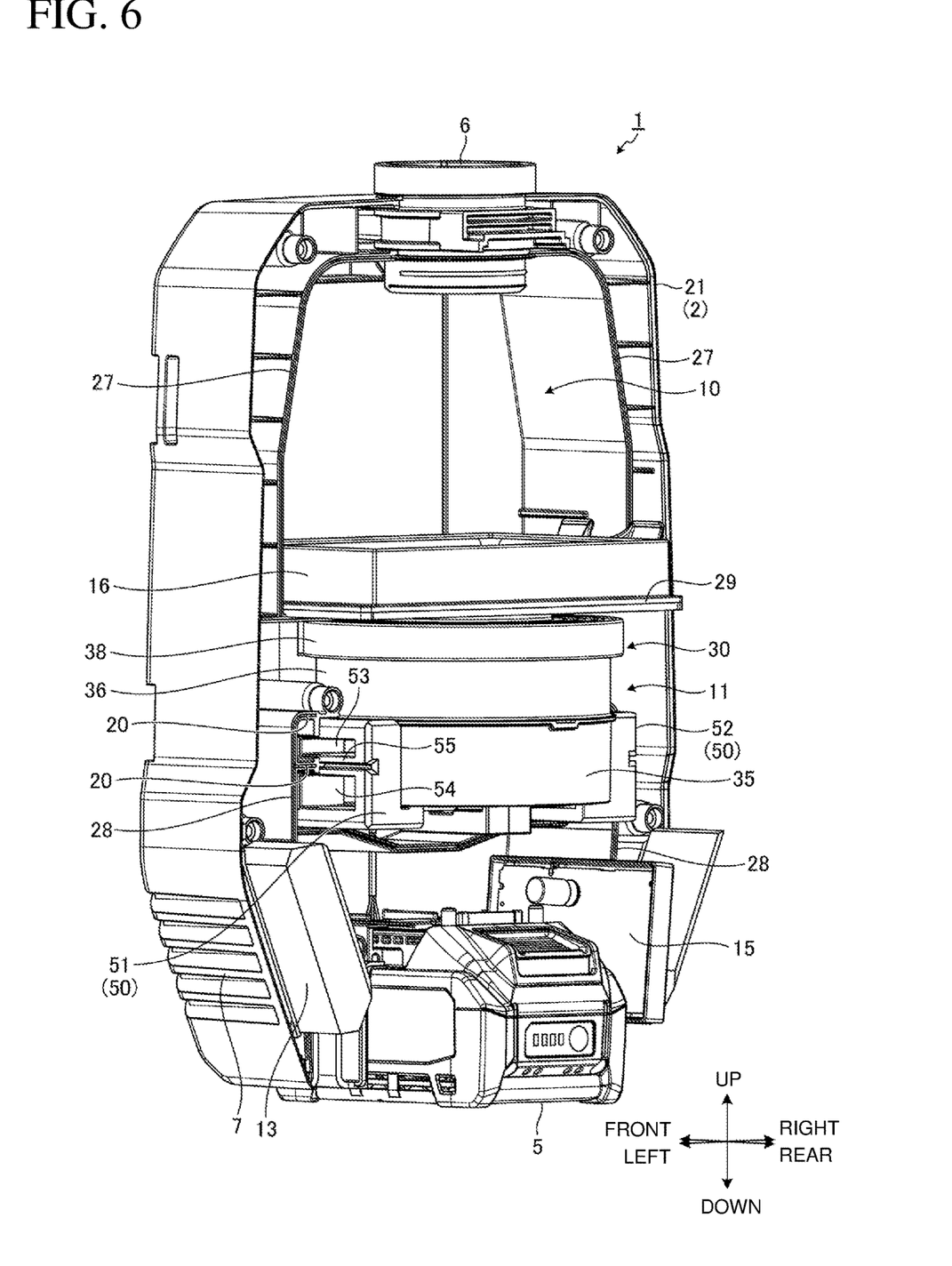
FIG. 6 is a perspective view of the dust collector according to the embodiment without the rear housing and the dust box cover as viewed from the left rear.
Figure 7:
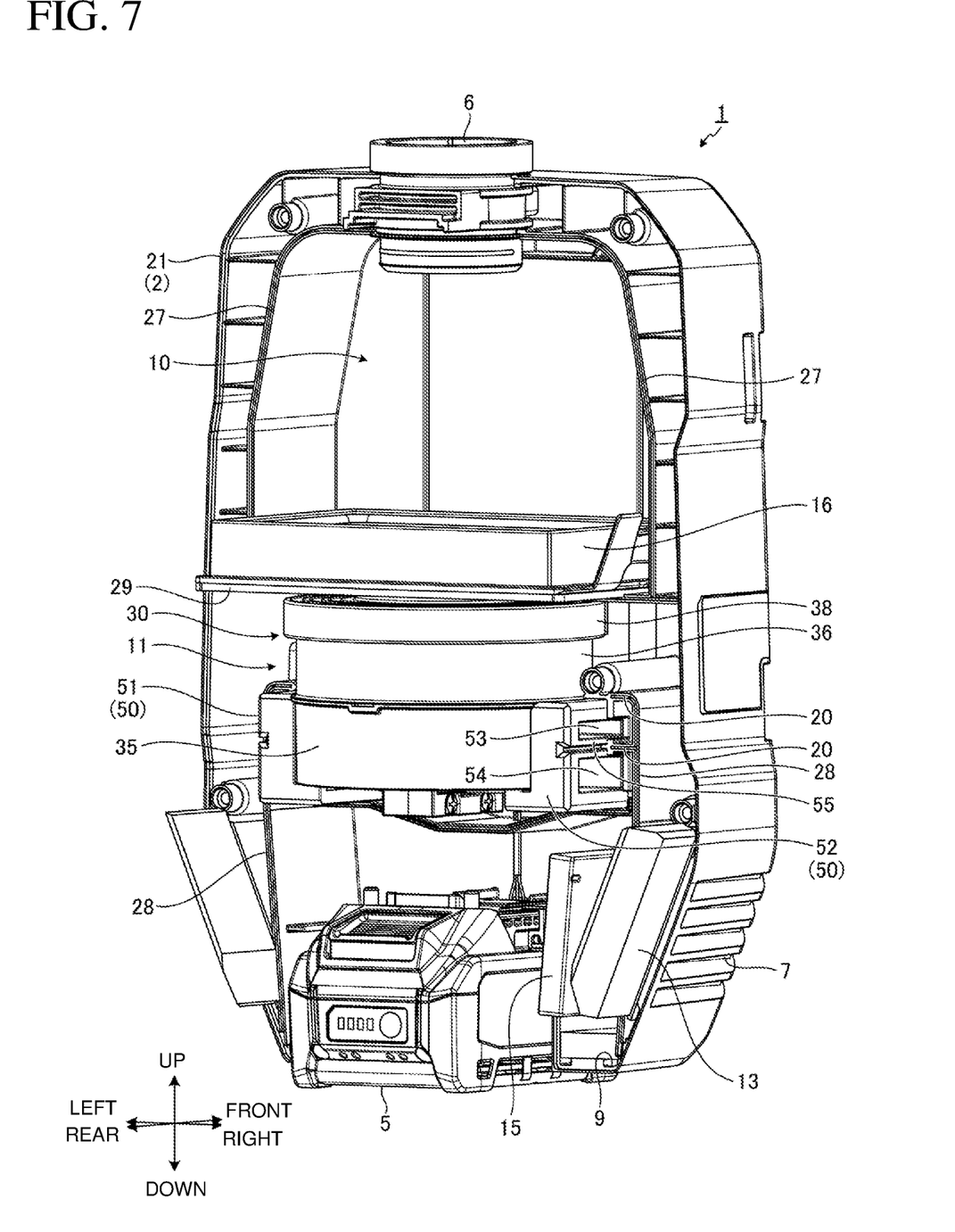
FIG. 7 is a perspective view of the dust collector according to the embodiment without the rear housing and the dust box cover as viewed from the right rear.
Figure 8:
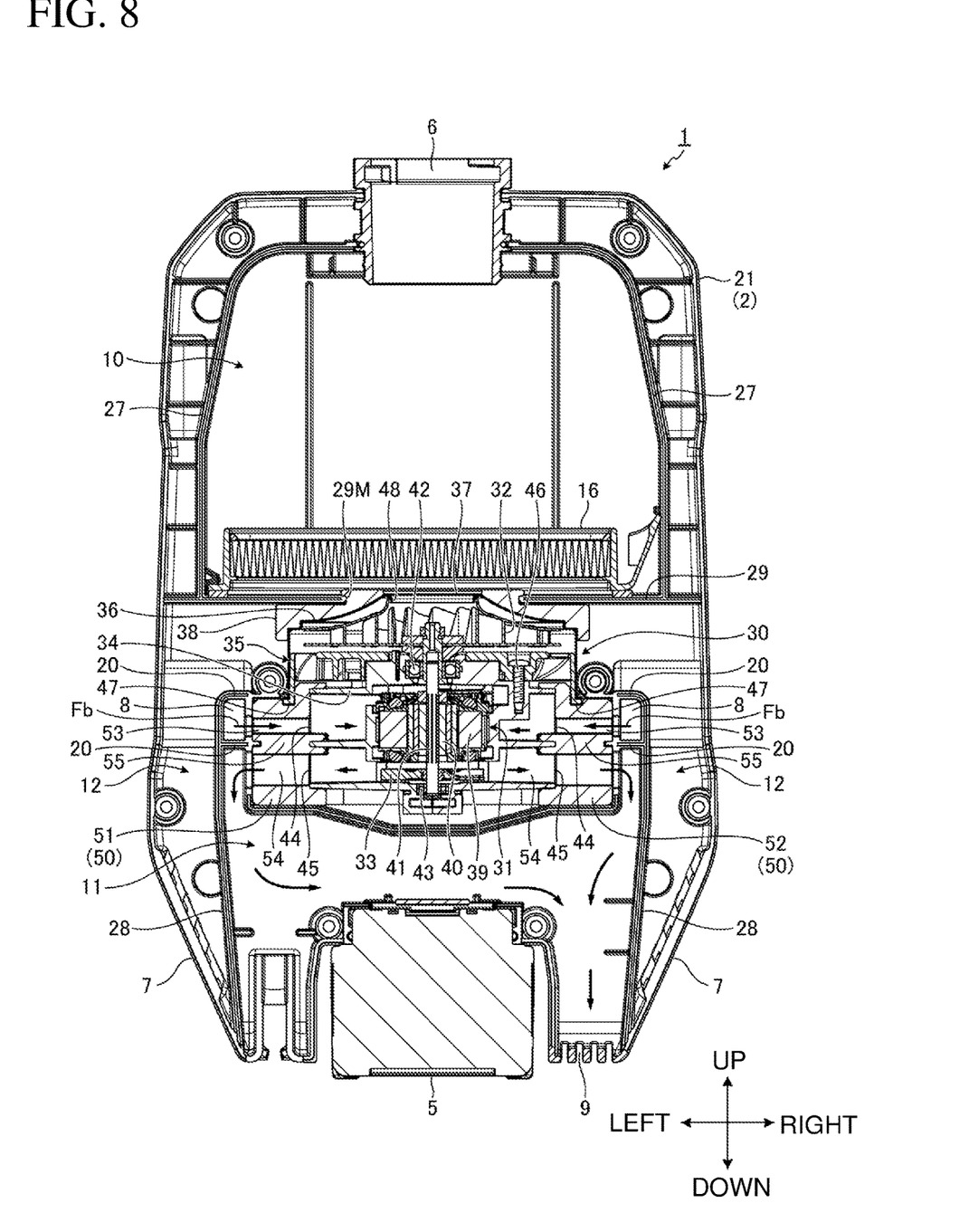
FIG. 8 is a cross-sectional view of the dust collector according to the embodiment.

FIG. 5 is a rear view of the dust collector 1 according to the embodiment without the rear housing 22 and the dust box cover 23. FIG. 6 is a perspective view of the dust collector 1 according to the embodiment without the rear housing 22 and the dust box cover 23 as viewed from the left rear. FIG. 7 is a perspective view of the dust collector 1 according to the embodiment without the rear housing 22 and the dust box cover 23 as viewed from the right rear. FIG. 8 is a cross-sectional view of the dust collector 1 according to the embodiment.

The body housing 2 includes a dust collection compartment 10, a motor compartment 11, and exhaust channels 12 in the internal space. The dust collection compartment 10 is located upward in the internal space of the body housing 2. The motor compartment 11 is located downward from the dust collection compartment 10 in the internal space of the body housing 2. The exhaust channels 12 are located rightward and leftward from the motor compartment 11 in the internal space of the body housing 2.

The suction port 6 is connected to the dust collection compartment 10. The suction port 6 is located in an upper portion of the dust collection compartment 10. The body opening 24 is connected to the dust collection compartment 10. The body opening 24 is located in a rear portion of the dust collection compartment 10. The dust box cover 23 is operable to cover and uncover the dust collection compartment 10.

The outlets 7 are connected to the exhaust channels 12. The outlets 7 are located below the exhaust channels 12. The outlets 7 receive sound absorbers 13. The sound absorbers 13 may be formed from, for example, a porous synthetic resin.

The body inlets 8 are connected to the motor compartment 11. The body inlets 8 are located in the front of the motor compartment 11. The two body inlets 8 align with each other in the lateral direction in an upper portion of the motor compartment 11.

The body outlet 9 is connected to the motor compartment 11. The body outlet 9 is located in a lower portion of the motor compartment 11. The body outlet 9 is adjacent to a lower portion of the battery compartment 26.

The body housing 2 includes partition walls 27. The partition walls 27 are on the inner surface of the body housing 2. The partition walls 27 located inside the body housing 2 define at least a part of the dust collection compartment 10. The dust collection compartment 10 accommodates a dust collection bag 14 as shown in FIG. 5. The dust collection bag 14 is connected to the suction port 6. The dust collection bag 14 may be, for example, a paper bag. The dust collection bag 14 collects dust sucked through the suction port 6. The user can open the dust box cover 23 and replace the dust collection bag 14 through the body opening 24.

The body housing 2 includes partition walls 28. The partition walls 28 are on the inner surface of the body housing 2. The partition walls 28 located inside the body housing 2 define at least a part of the motor compartment 11. The partition walls 28 separate the motor compartment 11 and the exhaust channels 12 from each other. The motor compartment 11 accommodates the drive unit 30 including the motor 31, supports 50, and a controller 15.

The body housing 2 has a partition wall 29. The partition wall 29 is on the inner surface of the body housing 2. The dust collection compartment 10 and the motor compartment 11 are separated from each other by the partition wall 29 and a filter 16. The filter 16 may be, for example, a high-efficiency particulate air (HEPA) filter. The filter 16 is located above the partition wall 29. The filter 16 is supported on the partition wall 29. The filter 16 faces the dust collection compartment 10.

The partition wall 29 has an opening 29M. The opening 29M connects the dust collection compartment 10 and the motor compartment 11 to each other. The filter 16 covers the opening 29M. Gas in the dust collection compartment 10 flows into the motor compartment 11 through the opening 29M.

The drive unit 30 includes the motor 31, a blowing fan 32, a cooling fan 33, a motor housing 34, a fan base 35, a fan cover 36, a mesh cover 37, and a support ring 38.

The motor 31 is accommodated in the body housing 2. The motor 31 is accommodated in the motor housing 34 inside the motor compartment 11. The motor 31 is a brushless inner-rotor motor. The motor 31 generates power for rotating the blowing fan 32 and the cooling fan 33. The motor 31 includes a stator 39, a rotor 40, and a rotor shaft 41. The rotor 40 is located inside the stator 39. The rotor shaft 41 is fixed to the rotor 40. The rotor shaft 41 extends vertically. The rotor shaft 41 is rotatably supported by bearings 42 and 43. The bearing 42 rotatably supports an upper portion of the rotor shaft 41. The bearing 43 rotatably supports a lower portion of the rotor shaft 41. The rotor shaft 41 has its rotation axis extending vertically.

The blowing fan 32 is rotated by the motor 31. The blowing fan 32 is fixed to the upper portion of the rotor shaft 41. The blowing fan 32 faces the opening 29M. The blowing fan 32 is located upward from the bearing 42. As the rotor shaft 41 rotates, the blowing fan 32 rotates. The blowing fan 32 generates a suction force at the suction port 6. The blowing fan 32 is rotated by the motor 31 to generate a suction force at the suction port 6.

The cooling fan 33 is rotated by the motor 31. The cooling fan 33 is fixed to the lower portion of the rotor shaft 41. The cooling fan 33 is located upward from the bearing 43. The cooling fan 33 is located downward from the stator 39. As the rotor shaft 41 rotates, the cooling fan 33 rotates. The cooling fan 33 generates a gas flow for cooling the motor 31. The cooling fan 33 rotates to flow gas around the motor 31. The cooling fan 33 is rotated by the motor 31 to feed gas to around the motor 31 and to discharge gas from around the motor 31.

The cooling fan 33 generates a suction force at the body inlets 8. The cooling fan 33 is rotated by the motor 31 to generate a suction force at the body inlets 8.

The blowing fan 32 and the cooling fan 33 are centrifugal fans. The blowing fan 32 has a larger outer diameter than the cooling fan 33. The blowing fan 32 is located outside and upward from the motor housing 34. The cooling fan 33 is accommodated in the motor housing 34 inside the motor compartment 11.

The motor housing 34 accommodates the motor 31 and the cooling fan 33 inside the body housing 2. The motor 31 and the cooling fan 33 are located in the internal space of the motor housing 34. The motor housing 34 supports the motor 31. The motor housing 34 supports both the bearings 42 and 43. The motor housing 34 is at least partially cylindrical.

The motor housing 34 has motor inlets 44 and motor outlets 45. The motor inlets 44 connect the inside and the outside of the motor housing 34. The motor outlets 45 connect the inside and the outside of the motor housing 34. The motor inlets 44 are located upward from the motor outlets 45. The motor inlets 44 are located in upper portions of the side surfaces of the motor housing 34. The motor outlets 45 are located in lower portions of the side surfaces of the motor housing 34. The motor housing 34 has the motor inlets 44 in each of its right and left side surfaces. The motor housing 34 has the motor outlets 45 in each of its right and left side surfaces.

Gas outside the motor housing 34 flows into the motor housing 34 through the motor inlets 44. Gas to be fed to around the motor 31 flows through the motor inlets 44.

Gas inside the motor housing 34 flows out of the motor housing 34 through the motor outlets 45. Gas discharged from around the motor 31 flows through the motor outlets 45.

The fan base 35 supports the motor housing 34. The fan base 35 at least partially surrounds the side surface of the motor housing 34. The fan base 35 at least partially faces the upper surface of the motor housing 34. The fan base 35 and the motor housing 34 are fastened together with a screw 46.

The fan base 35 has openings 47 in each of its right and left side surfaces. The motor inlets 44 and the motor outlets 45 are located inside the opening 47.

The fan cover 36 at least partially covers the blowing fan 32. The fan cover 36 at least partially surrounds the fan base 35. The fan cover 36 is at least partially located upward from the fan base 35. The fan cover 36 is supported by the fan base 35. The fan cover 36 at least partially surrounds the blowing fan 32. The fan cover 36 is at least partially located upward from the blowing fan 32. The fan cover 36 has a fan inlet 48. The fan inlet 48 is located in an upper portion of the fan cover 36. The fan inlet 48 faces upward. The fan inlet 48 is located inside the opening 29M. The fan inlet 48 faces the filter 16. The fan cover 36 has its upper end facing the filter 16.

The mesh cover 37 is received in the fan inlet 48.

The support ring 38 is supported on the upper surface of the fan cover 36. The support ring 38 is annular and formed from synthetic rubber, such as nitrile rubber (NBR) or silicone rubber. The support ring 38 is at least partially located between the upper surface of the fan cover 36 and the lower surface of the partition wall 29. The support ring 38 is at least partially located inside the opening 29M. The support ring 38 is in tight contact with both the fan cover 36 and the partition wall 29. The support ring 38 seals the boundary between the fan cover 36 and the partition wall 29.

The supports 50 support the motor 31. The supports 50 in the embodiment support the motor housing 34. The supports 50 support the motor 31 with the motor housing 34.

The supports 50 support the sides of the motor housing 34. The supports 50 also support a lower portion of the motor housing 34. The supports 50 in the embodiment include a support 51 and a support 52. The support 51 is located on the left of the motor housing 34. The support 52 is located on the right of the motor housing 34. The support 51 at least partially supports a left portion of the motor housing 34. The support 51 at least partially supports the lower portion of the motor housing 34. The support 52 at least partially supports a right portion of the motor housing 34. The support 52 at least partially supports the lower portion of the motor housing 34.

The supports 50 are supported by the body housing 2. The partition walls 28 include ribs 20. The ribs 20 protrude from the partition walls 28. The supports 50 are supported by the ribs 20.

The supports 50 include channels, and gas flown by the cooling fan 33 flows through the channels. The channels are located inside the supports 50.

The channels include intake channels 53 and exhaust channels 54. Gas to be fed to around the motor 31 flows through the intake channels 53. Gas discharged from around the motor 31 flows through the exhaust channels 54. The intake channels 53 and the exhaust channels 54 are both located inside the supports 50.

The intake channels 53 are located upward from the exhaust channels 54. The intake channels 53 have their inlets adjacent to the body inlets 8. The supports 50 include partitions 55 for separating the intake channels 53 and the exhaust channels 54 from each other. The partitions 55 are located between the intake channels 53 and the exhaust channels 54.

The supports 50 are at least partially located inside the opening 47 of the fan base 35. The supports 50 are in contact with at least a part of the motor housing 34.

The intake channels 53 are connected to the motor inlets 44. Gas to be fed to around the motor 31 flows through the intake channels 53 and the motor inlets 44 and then into the motor housing 34.

The exhaust channels 54 are connected to the motor outlets 45. Gas discharged from around the motor 31 flows through the motor outlets 45 and the exhaust channels 54 and then flows out of the motor housing 34.

The supports 50 are elastic members. The elastic members are, for example, synthetic rubber. The synthetic rubber is, for example, NBR or silicone rubber. The supports 50 serve as dampers (vibration damping members). The supports 50 reduce transmission of vibrations from the motor 31 to the body housing 2.

The controller 15 includes a computer system. The controller 15 outputs control signals for controlling an electronic device incorporated in the dust collector 1. The electronic device includes the motor 31. The controller 15 outputs control signals for controlling the motor 31. The controller 15 includes a control board on which multiple electronic components are mounted. Examples of the electronic components mounted on the control board include a processor such as a central processing unit (CPU), a non-volatile memory such as a read-only memory (ROM) or a storage device, a volatile memory such as a random-access memory (RAM), a transistor, a capacitor, and a resistor.

The motor 31 runs on power supplied from the battery pack 5. The controller 15 operates on power supplied from the battery pack 5.

The motor 31 runs to rotate both the blowing fan 32 and the cooling fan 33.

When the blowing fan 32 rotates, a suction force is generated at the suction port 6. This sucks gas from the suction port 6 to the dust collection compartment 10. The suction port 6 is connected to the dust collection bag 14. The dust collection bag 14 collects dust contained in the gas. The gas flows through the dust collection bag 14 and then through the filter 16. The filter 16 collects fine dust that the dust collection bag 14 has failed to collect. After flowing through the filter 16, the gas flows through the opening 29M and the inside of the support ring 38 and then enters the blowing fan 32 through the fan inlet 48. The mesh cover 37 is received in the fan inlet 48 to reduce foreign matter entering the fan cover 36. After flowing through the blowing fan 32, the gas flows through the exhaust channels 12 and is then discharged out of the body housing 2 through the outlets 7.

When the cooling fan 33 rotates, a suction force is generated at the body inlets 8. The suction force generated at the body inlets 8 sucks gas from the body inlets 8 to the motor compartment 11, as indicated by arrows Fb in FIG. 8. After sucked into the motor compartment 11, the gas flows through the intake channels 53 and the motor inlets 44 into the motor housing 34 to cool the motor 31. After cooling the motor 31, the gas flows through the motor outlets 45 and the exhaust channels 54 and then flows out of the motor housing 34. The gas is then discharged out of the body housing 2 through the body outlet 9.

In the present embodiment, the supports 50 supporting the motor 31 include channels. The dust collector 1 can thus avoid being upsized. The channels include the intake channels 53, through which gas to be fed to around the motor 31 flows, and the exhaust channels 54, through which gas discharged from around the motor 31 flows. When the cooling fan 33 rotates, gas is fed to around the motor 31 through the intake channels 53. Thus, the motor 31 is cooled effectively. After cooling the motor 31, the gas is discharged from around the motor 31 through the exhaust channels 54.

The supports 50 are supported by the body housing 2. In other words, the motor 31 is supported by the body housing 2 with the supports 50.

The dust collector 1 according to the embodiment separately includes the blowing fan 32 for generating a suction force at the suction port 6 and the cooling fan 33 for generating a gas flow for cooling the motor 31. This allows the blowing fan 32 to generate a strong suction force at the suction port 6. The cooling fan 33 effectively cools the motor 31. In addition, for example, when a dust collection hose (not shown) connected to the suction port 6 or the filter 16 is clogged and the blowing fan 32 is unable to generate a gas flow, the motor 31 may still be cooled by the rotation of the cooling fan 33 separate from the blowing fan 32.

The body housing 2 has the body inlets 8. The cooling fan 33 generates a suction force at the body inlets 8. Gas sucked from outside the body housing 2 effectively cools the motor 31.

The supports 50 include partitions 55 for separating the intake channels 53 and the exhaust channels 54 from each other. In this structure, gas fed to around the motor 31 and gas discharged from around the motor 31 are less likely to mix with each other.

In the embodiment, the motor 31 is supported by the motor housing 34. The supports 50 support the motor housing 34. In other words, the supports 50 support the motor 31 with the motor housing 34.

The supports 50 support the sides of the motor housing 34. The driving motor 31 may vibrate the motor housing 34. In this case, the sides of the motor housing 34 may vibrate more than a central portion. The supports 50, which support the sides of the motor housing 34, reduce the vibration of the motor housing 34.

The supports 50 in the embodiment include the support 51 supporting the left portion of the motor housing 34 and the support 52 supporting the right portion of the motor housing 34. This effectively reduces the vibration of the motor housing 34.

The supports 50 support the lower portion of the motor housing 34. In other words, the motor housing 34 is stably supported by the supports 50.

The motor housing 34 has the motor inlets 44 connected to the intake channels 53. More specifically, gas for cooling the motor 31 flows through the intake channels 53 and the motor inlets 44 and is then fed to around the motor 31.

The motor housing 34 has the motor outlets 45 connected to the exhaust channels 54. More specifically, after cooling the motor 31, the gas flows through the motor outlets 45 and the exhaust channels 54 and is then discharged from around the motor 31.

The supports 50 are elastic members. The supports 50 serve as dampers (vibration damping members). The supports 50 reduce transmission of vibrations from the motor 31 to the body housing 2. When the body housing 2 is in contact with the user's back, the supports 50 reduce the vibration from the motor 31 transmitted to the user's back.

OTHER EMBODIMENTS

In the above embodiment, the supports 50 include both the intake channels 53 and the exhaust channels 54. In the supports 50, the intake channels 53 may be included and the exhaust channels 54 may be eliminated. In the supports 50, the exhaust channels 54 may be included and the intake channels 53 may be eliminated.

In the above embodiment, the intake channels 53 are located in the supports 50. The intake channels 53 may be located, for example, between the supports 50 and at least a part of the body housing 2. In the same manner, the exhaust channels 54 may be formed, for example, between the supports 50 and at least a part of the body housing 2.

REFERENCE SIGNS LIST 1 dust collector
2 body housing
2A front surface
2B rear surface
2C upper surface
2D lower surface
2E left side surface
2F right side surface
3 battery mount
4 harness belt
4A shoulder belt
4B waist belt
5 battery pack
6 suction port
7 outlet
8 body inlet
9 body outlet
10 dust collection compartment
11 motor compartment
12 exhaust channel
13 sound absorber
14 dust collection bag
15 controller
16 filter
20 rib
21 front housing
22 rear housing
23 dust box cover
24 body opening
25 latch
26 battery compartment
27 partition wall
28 partition wall
29 partition wall
29M opening
30 drive unit
31 motor
32 blowing fan
33 cooling fan
34 motor housing
35 fan base
36 fan cover
37 mesh cover
38 support ring
39 stator
40 rotor
41 rotor shaft
42 bearing
43 bearing
44 motor inlet
45 motor outlet
46 screw
47 opening
48 fan inlet
50 support
51 support
52 support
53 intake channel
54 exhaust channel
55 partition

What is claimed is:

1. A dust collector, comprising:
   a body housing;
   a motor located inside the body housing;
   a cooling fan rotatable by the motor to feed a gas to around the motor and to discharge the gas from around the motor; and
   a support including a channel through which the gas is flown by the cooling fan, the support supporting the motor, wherein
   the body housing contains a motor housing accommodating the motor and the cooling fan,
   the support supports the motor housing,
   the motor housing has a motor inlet through which the gas to be fed to around the motor flows, and
   the channel includes an intake channel connected to the motor inlet.

2. The dust collector according to claim 1, wherein the channel is located inside the support.

3. The dust collector according to claim 1, wherein the support supports a side of the motor housing.

4. The dust collector according to claim 1, wherein the support supports a lower portion of the motor housing.

5. The dust collector according to claim 1, wherein the motor housing has a motor outlet through which the gas to be discharged from around the motor flows, and the channel includes an exhaust channel connected to the motor outlet.

6. The dust collector according to claim 1, wherein the support includes an elastic member.

7. The dust collector according to claim 1, wherein the support is supported by the body housing.

8. The dust collector according to claim 7, wherein the body housing includes a suction port, and the dust collector further comprises a blowing fan rotatable by the motor to generate a suction force at the suction port.

9. The dust collector according to claim 7, wherein the channel is located inside the support.

10. The dust collector according to claim 7, wherein the channel includes an intake channel through which the gas to be fed to around the motor flows.

11. The dust collector according to claim 1, wherein the body housing includes a suction port, and the dust collector further comprises a blowing fan rotatable by the motor to generate a suction force at the suction port.

12. The dust collector according to claim 11, wherein the channel is located inside the support.

13. The dust collector according to claim 11, wherein the body housing has a body inlet, and the cooling fan is rotatable to generate a suction force at the body inlet.

14. The dust collector according to claim 13, wherein the channel is located inside the support.

15. The dust collector according to claim 1, wherein the channel includes an intake channel through which the gas to be fed to around the motor flows.

16. The dust collector according to claim 15, wherein the channel includes an exhaust channel through which the gas discharged from around the motor flows.

17. The dust collector according to claim 16, wherein the intake channel and the exhaust channel are located inside the support.

18. The dust collector according to claim 17, wherein the support includes a partition separating the intake channel and the exhaust channel from each other.

19. A dust collector, comprising:
- a body housing;
- a motor located inside the body housing;
- a cooling fan rotatable by the motor to feed a gas to around the motor and to discharge the gas from around the motor; and
- a support including a channel through which the gas is flown by the cooling fan, the support supporting the motor, wherein the body housing contains a motor housing accommodating the motor and the cooling fan, the support supports the motor housing, the motor housing has a motor outlet through which the gas to be discharged from around the motor flows, and the channel includes an exhaust channel connected to the motor outlet.

20. The dust collector according to claim 19, wherein the support is supported by the body housing.

* * * * *